US007733241B2

(12) United States Patent
Haswell et al.

(10) Patent No.: US 7,733,241 B2
(45) Date of Patent: Jun. 8, 2010

(54) TELEMETRY UNIT

(75) Inventors: Geoffrey Haswell, Sheffield (GB); Simon William Fawcett, Melton Mowbray (GB); Paul Reece Holdsworth, Melton Mowbray (GB); Stephen John Bowles, Melton Mowbray (GB); David Matthew Smart, Melton Mowbray (GB); Miguel Jesus Garcia-Hernandez, Barcelona (ES); Juan Antonio Chavez-Dominguez, Barcelona (ES); Antonio Turo-Peroy, Barcelona (ES); Jordi Salazar-Soler, Barcelona (ES)

(73) Assignee: Piezotag Limited, West Midlands (GB)

( * ) Notice: Subject to any disclaimer, the term of this patent is extended or adjusted under 35 U.S.C. 154(b) by 862 days.

(21) Appl. No.: 10/529,603

(22) PCT Filed: Oct. 1, 2003

(86) PCT No.: PCT/GB03/04319

§ 371 (c)(1),
(2), (4) Date: Nov. 28, 2006

(87) PCT Pub. No.: WO2004/030948

PCT Pub. Date: Apr. 15, 2004

(65) Prior Publication Data
US 2007/0063869 A1 Mar. 22, 2007

(30) Foreign Application Priority Data
Oct. 1, 2002 (GB) ................. 0222680.1

(51) Int. Cl.
*H04Q 9/00* (2006.01)

(52) U.S. Cl. .......... 340/870.07; 340/442; 340/447; 73/146.3; 73/146.4
(58) Field of Classification Search ............ 340/870.07, 340/442, 447; 73/146.3, 146.4
See application file for complete search history.

(56) References Cited

U.S. PATENT DOCUMENTS 7,511,404 B2 * 3/2009 Lee ........................ 310/339
7,518,493 B2 * 4/2009 Bryzek et al. ............... 340/442

FOREIGN PATENT DOCUMENTS

EP 1 013 483 6/2000

OTHER PUBLICATIONS

The International Search Report for PCT Application No. PCT/GB2003/004319.

* cited by examiner

*Primary Examiner*—Albert K Wong
(74) *Attorney, Agent, or Firm*—Alston & Bird LLP

(57) ABSTRACT

A telemetry unit (100) is provided for mounting to the inside of a pneumatic tire, which includes sensors for measuring the pressure and temperature within the tire and an RF transmitter for transmitting measured data to an on-board display remote location. The unit (100) includes a piezoelectric element (114) supported in a housing (112) with an actuator (136) arranged for contact with the element (114), to deflect the element (114) in response to external forces acting on the actuator (136) during rotation of the tire. For every rotation of the tire, cyclic pulses of electrical charge are generated by the deflection of the element (114). The unit (100) includes control means which controls the consumption of stored charge when measuring and transmitting data and is arranged to vary the rate of transmission of data from the unit (100) in dependence on the rotary speed of the tire.

10 Claims, 9 Drawing Sheets

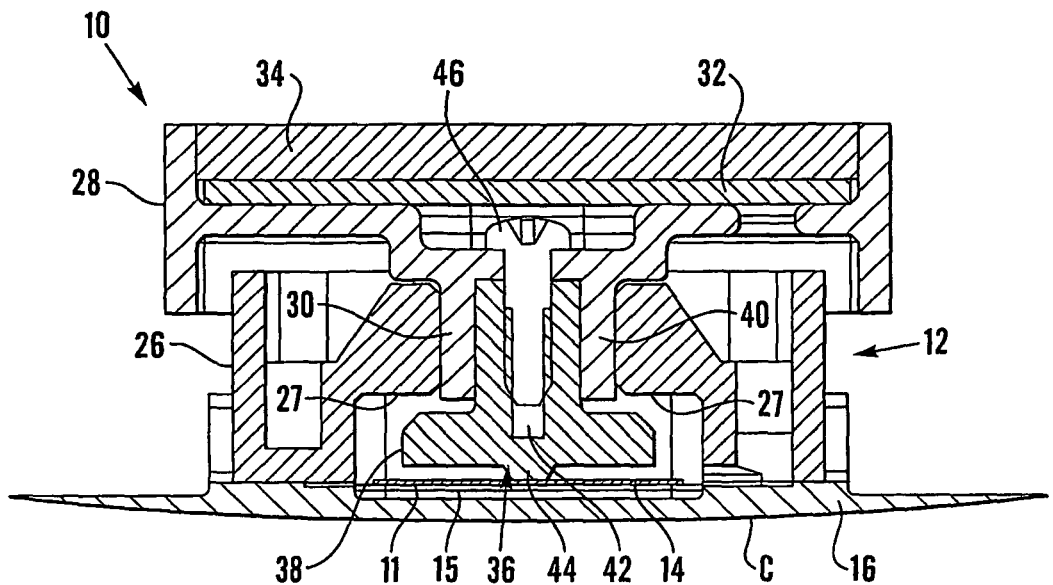
Fig.2
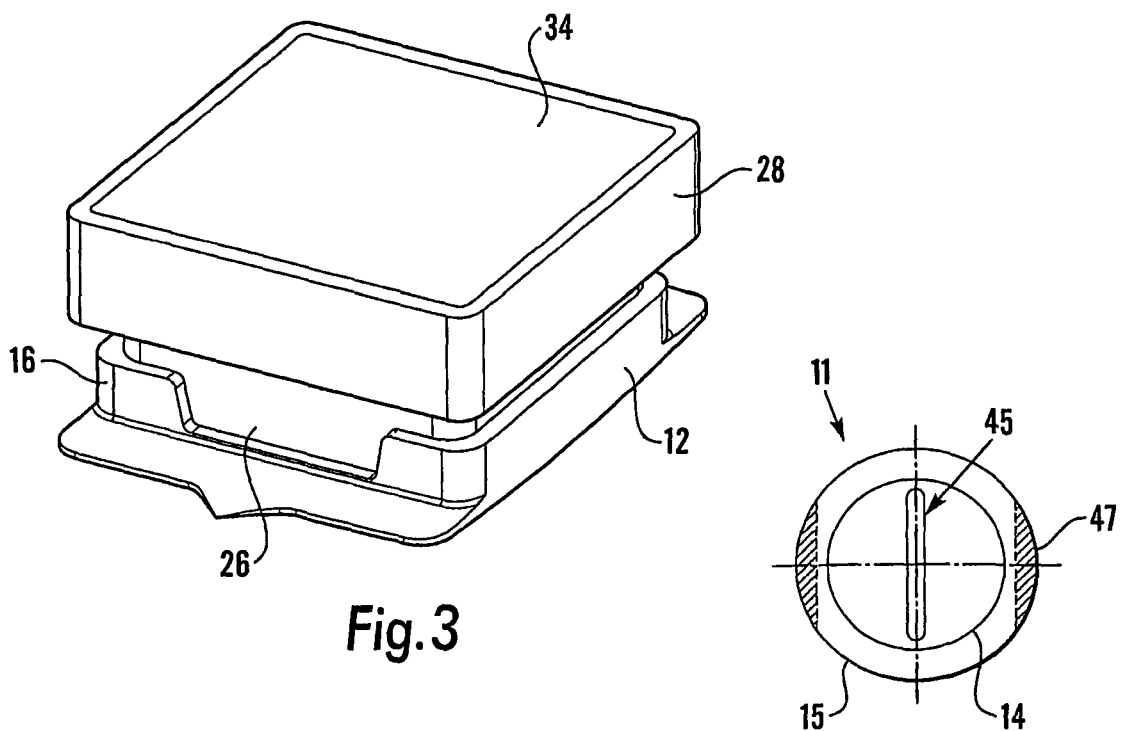
Fig.3
Fig.4

TELEMETRY UNIT

BACKGROUND OF THE INVENTION

The present invention relates to a telemetry unit for a tyre monitoring apparatus.

It is known to provide a tyre monitoring apparatus for measuring the pressure within vehicle tyres. The tyre monitoring apparatus may also measure other parameters within a tyre environment, such as the local temperature of a tyre. The measured data is transmitted, for example via a radio wave link, to the cabin of the vehicle where it is electronically processed before being displayed to the vehicle driver. This enables the recipient of the transmitted data to monitor changes in the condition of the tyre, for example to reduce damage to the tyre(s) of a vehicle, or to predict tyre failure. This is of particular advantage at high vehicle speeds, when the environment within a tyre is at its most hostile and the likelihood of damage to a tyre and, indeed, injury to the occupants of the vehicle, is at its greatest.

The majority of existing tyre monitoring apparatus use a battery as the power source, which is located on or within a wheel or tyre. Such arrangements have several undesirable limitations, for example limited battery life and size or weight which can be accommodated within a tyre. This can have a further undesirable knock on effect, in that if there is a limited power source available, for example as a result of weight implications, the number and frequency of data transmissions that can be relayed for processing is compromised.

It is an object of the invention to reduce or substantially obviate the disadvantages referred to above.

BRIEF SUMMARY OF THE INVENTION

According to the present invention, there is provided a telemetry unit for a tyre monitoring apparatus, the telemetry unit including a housing having sensor means for measuring data relevant to the local environment of the telemetry unit, transmission means for transmitting measured data to a remote location, a piezoelectric power generator adapted to generate and store an electrical charge in response to rotation of the tyre for powering the unit, and control means for controlling the sensor means and transmission means, in which the control means is arranged to vary the rate of transmission of data from the telemetry unit in dependance on the rotary speed of the tyre.

Preferably, the piezoelectric power generator is arranged to produce at least one pulse of electric charge for each rotation of the tyre, and the control means is adapted to monitor the number and/or frequency of the pulses generated in order to determine the appropriate rate of transmission of data.

The control means is adapted to initiate monitoring of the local environment and transmission of measured data after a predetermined number of pulses has been detected.

In a preferred embodiment, the housing is adapted to be mounted to an inner wall of a tyre.

An exterior surface of the housing may have a substantially arcuate profile adapted for bonding to an arcuate interior surface of a vehicle tyre.

An exterior surface of the housing may include an external profile for complimentary engagement with the internal pattern of a vehicle tyre.

In a preferred embodiment, the housing is releasably mounted on a footing adapted to be bonded to the internal wall of a tyre, for example by means of clips. The footing may include air channels for allowing movement of air about the housing, in use.

Preferably, the sensor means includes at least one of a pressure sensor and/or a temperature sensor.

Conveniently, an actuator is movably mounted in the housing and adapted for contact with the piezoelectric element under centrifugal forces.

The invention is advantageous in that it provides a telemetry unit which is suitable for measuring and transmitting data from inside the harsh environment of a rotating pneumatic tyre. Measurement and transmission of data from within the tyre is possible for normal operating conditions within a tyre, for detecting potential failure or blow out of a tyre, for example.

BRIEF DESCRIPTION OF THE DRAWINGS

The invention will now be described, by way of example, with reference to the accompanying drawings, in which:

FIG. 2 is a partial cross-sectional view of the unit shown in FIG. 1 in an assembled, rest position;

FIG. 3 is a perspective view the unit shown in FIG. 2;

FIG. 4 is a schematic plan view of the piezoelectric disc and brass mounting which forms part of the unit shown in FIGS. 1 to 3;

DETAILED DESCRIPTION OF PREFERRED EMBODIMENTS

Figure 1:
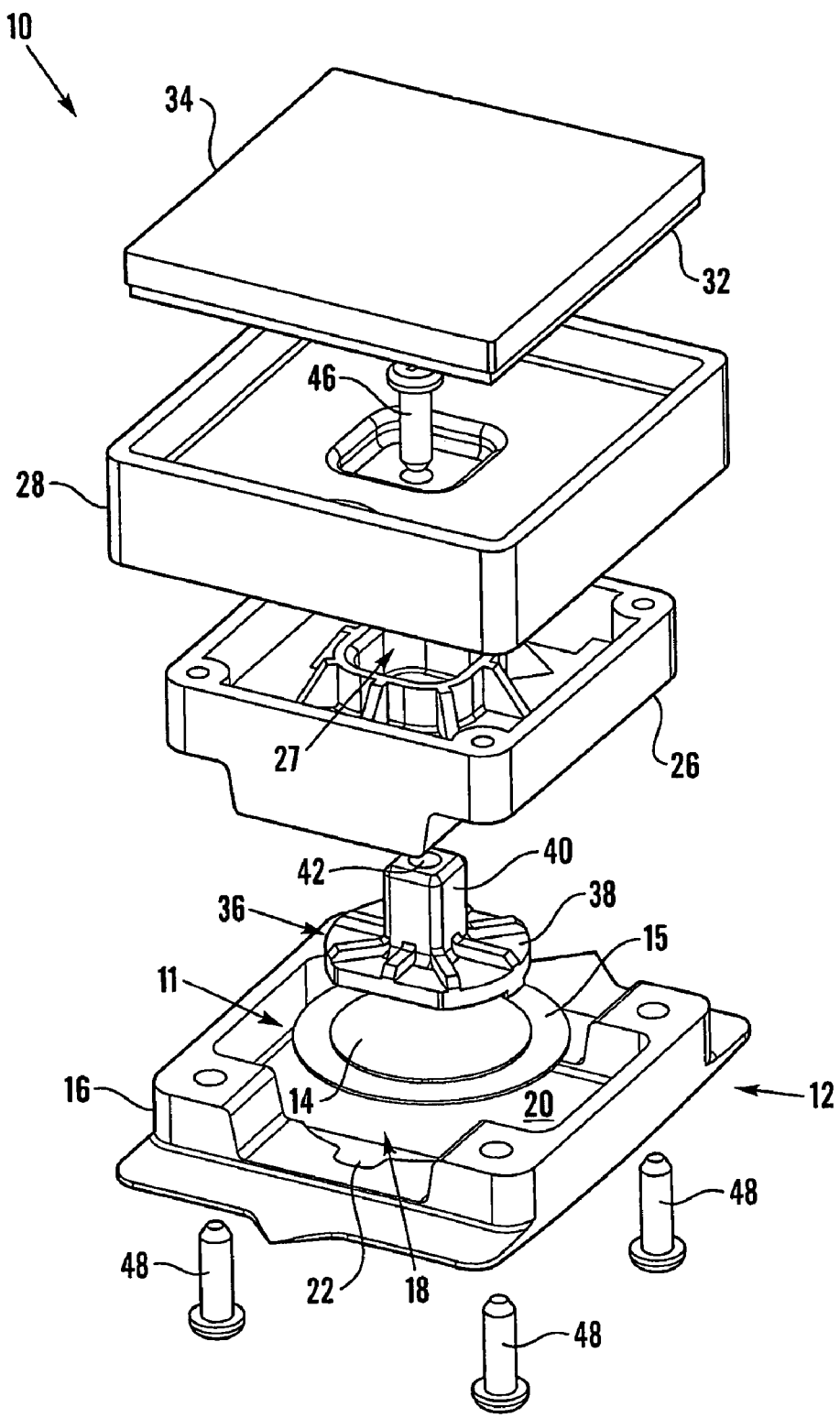
FIG. 1 is an exploded perspective view of an in-tyre power/sensor or telemetry unit in accordance with a preferred embodiment of the invention.

Referring to FIGS. 1 to 4, a power generator/sensor unit is indicated generally at 10, for use in a tyre monitoring apparatus. The unit 10 includes a housing 12 made as a reinforced injection moulding composite for mounting in and adapted to withstand the harsh environment of pneumatic vehicle tyre. Although the housing 102 is described as being made as a composite moulding, any suitable material can be used.

The housing 12 has a base or footing 16 having a shallow convex outer profile, indicated at C in FIG. 2, for bonding to a correspondingly arcuate interior surface of a vehicle tyre. The base 16 defines a chamber, indicated at 18 in FIG. 1, having an internal base wall 20.

The unit 10 includes a piezoelectric element 11 in the form of a piezoceramic disc 14 having a radius R, which is mounted centrally on a brass supporting disc 15 having a radius greater than R. The element 11 is mounted in the housing 12 for generating electrical power to operate circuitry within the unit 10.

The base 16 of the housing 12 includes two opposed recesses 22, one of which can be seen clearly in FIG. 1, for supporting part of the periphery of the brass disc 15. When supported on the base 16, the central portion of the brass disc 15 is spaced apart from the base wall 20 by a small distance. A cover 26 is received on the base 16, which overlays the part of the periphery of the brass disc 15 supported on the recesses 22, such that the disc is clamped between the cover 26 and the recesses 22 along two edge portions 47.

A cap 28 is provided over the cover 26, the cap including a central formation 30 which extends through a central aperture 27 in the cover 26.

Figure 5:
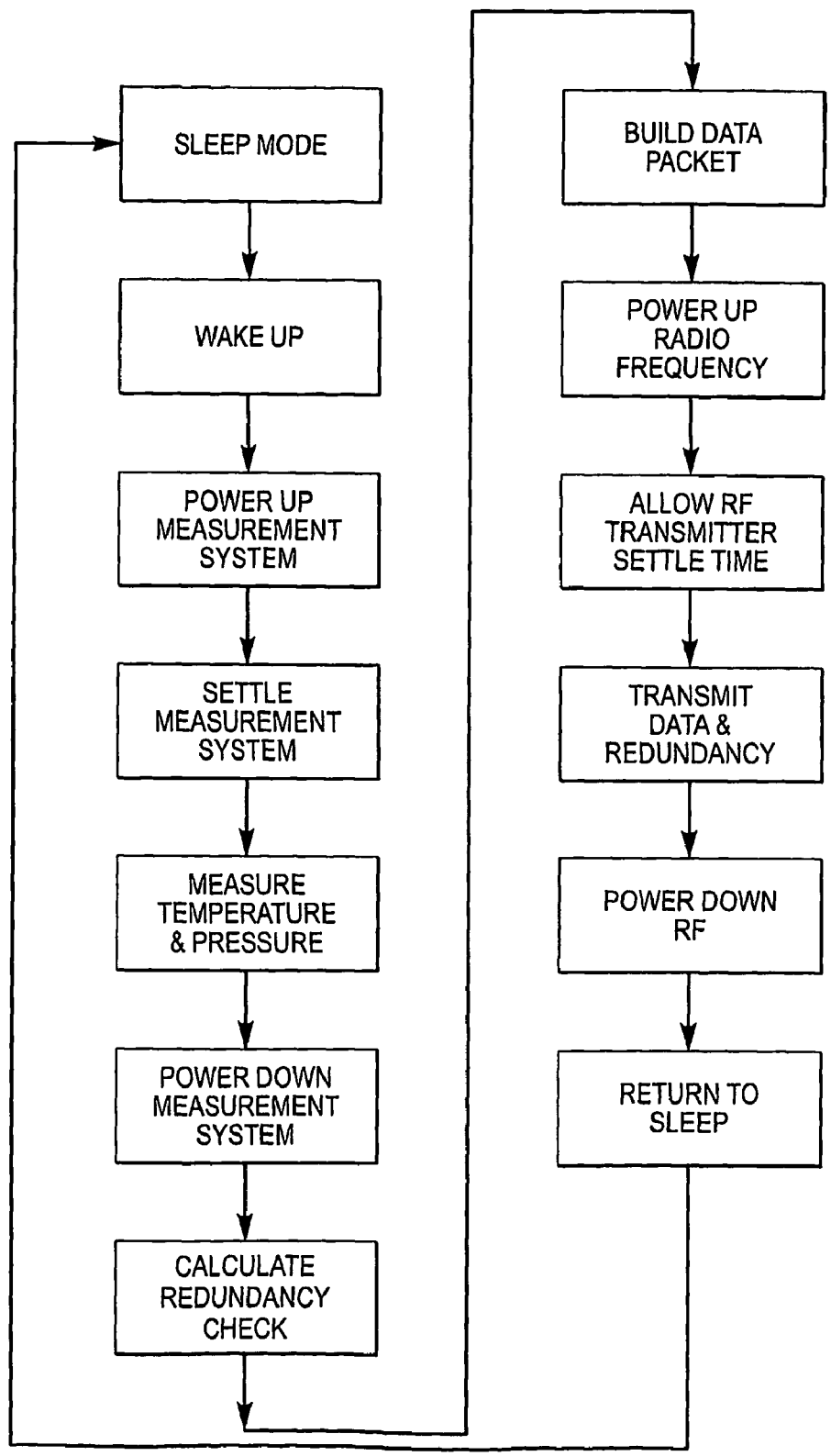
FIG. 5 is a flow diagram showing the stages involved in a low power consumption protocol for controlling the measurement and transmission of data from the unit shown in FIGS. 1 to 3.
Figure 5A:
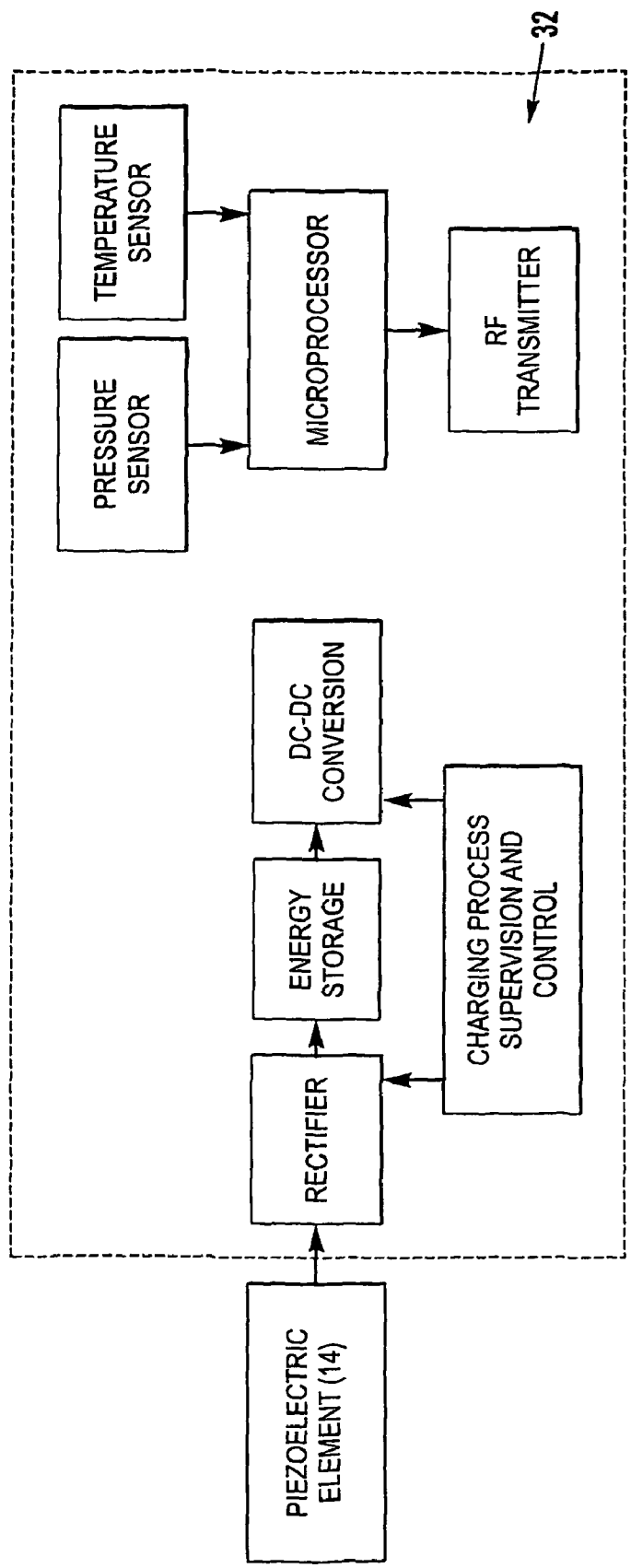
FIG. 5a is a block diagram showing the interrelationship between components of the power generator.

A printed circuit board (PCB) 32 is mounted in the housing 12 on the cap 28. As shown in FIG. 5a, the PCB 32 includes a micro processor, a radio frequency (RF) transmitter, pressure and temperature sensor circuitry, including pressure and temperature sensors, and supervision and control circuitry, which form part of a tyre monitoring apparatus. The PCB 32 also includes a rectifier for converting an alternating current output from the piezoceramic disc 14 into a direct current output; an energy storage element in the form of a series of a capacitors, which store the direct current output from the rectifier until required, and a DC-DC controller which is provided for regulating voltage output from the capacitors. The unit 10 uses ultra low leakage type capacitors, to ensure that as high a percentage of the generated charge is retained as possible and that internal leakage is kept to a minimum.

The PCB 32 is in electrical communication with the piezoceramic disc 14 via two wires, not shown, and is securably located on the cap 28 by a potting compound 34, to protect the PCB 32 during installation or transit, and from the harsh environment within a rotating pneumatic tyre. The potting compound 34 can be any suitable type but in this embodiment is a two-part epoxy adhesive.

An actuator 36 is disposed between the piezoceramic disc 14, the cover 26 and the cap 28, the actuator consisting of an integrally formed foot 38 and a stem 40. The stem 40 extends into the central formation of the cap 28 and includes a central bore 42. As can be seen clearly in FIG. 2, the foot 38 includes an integrally formed elongate projection or nose 44, which is in contact with the piezoceramic element. The nose 44 extends diametrically across the piezoelectric element 11, as indicated in FIG. 4, which shows the contact area 45 of the nose 44 on the piezoelectric element 11 and the areas of support 47 for the disc 15 on the base 16. It will be appreciated that the piezoelectric element 11 is configured substantially as a simply supported beam, supported on one side by the recesses 22 in the base 16 and contactable on its opposite side by the nose 44 of the actuator 36.

The actuator 36 is connected to the cap 28 by a screw 46 which passes through the cap 28 and is securably received in the bore 42 of the stem 40. The base 16 is connected to the cover 26 by four screws 48, which pass through the corners of the base 16 and which are securably received in the cover 26.

The arrangement is such that the piezoelectric element 11 can be deflected downwardly (as viewed in FIG. 2) under the influence of the actuator 36, as will be described in more detail below. However, the maximum deflection of the piezoelectric element 11 is limited by the distance between the underside of the brass disc 15 and the internal base wall 20, set at 0.4 mm in the embodiment of FIGS. 1 to 4. Thus, the element 11 is protected against excess deflexion, which might otherwise damage the structure and generating capacity of the element 11. The movement of the actuator 36 within the housing 12 in the opposite direction, i.e. perpendicularly away from the piezoceramic disc 14, upwards as viewed in FIG. 2, is restricted by walls 27 of the cover 26. In the embodiment of FIGS. 1 to 4, the maximum distance between the upper side of the foot 38 of the actuator 36 and the walls 27 of the cover 26 is 0.6 mm when the power generator 10 is in the rest position shown in FIG. 2. Hence, the maximum travel of the actuator 36 within the housing 12 is 1 mm in the embodiment of FIGS. 1 to 4. This maximum distance of travel of the actuator 36 within the housing 12 is set at a predetermined low value to protect the piezoceramic disc 14 from damage due to deflection and/or impact of the actuator 36 on the upper surface of the piezoceramic disc 14 in use. It will be understood that the maximum travel of the actuator and deflection of the piezoelectric element can be limited to any distance suitable for protecting the integrity of the structure and charge generating capacity of the piezoelectric element.

The arrangement of the piezoceramic disc 14, in combination with the components of the PCB 32 which are associated with the piezoceramic disc 14, as described above, form part of a power generator, for supplying power for the circuitry of the unit 10.

Operation of the power generator will now be described, by way of example, in which the unit 10 is mounted in a pneumatic tyre on the wheel of a vehicle, with the outer surface of the base 16 of the housing 12 bonded to a correspondingly arcuate profile of an interior surface of the tyre, and in which the unit 10 includes a piezoceramic disc 14 of any suitable known construction.

It will be appreciated that mechanical excitation of the disc 14 generates a voltage. The effect is substantially linear, i.e. the electric field generated varies directly with the applied mechanical stress, and is direction dependent, so that compressive and tensile stresses generate voltages of opposite polarity.

The cap 28, PCB 32, potting compound 34 and the actuator 36 act on the disc 14 as a single unit mass, in use, i.e. with the cap, actuator, circuitry and potting compound acting as a composite actuating mass. When the wheel is in rotation, centrifugal forces act on the cap 28, PCB 32 and the potting compound 34, which urge the actuator 36 radially outwards in the direction of the piezoelectric element 11. This centrifugal action on the actuator 36 causes the piezoelectric element 11 to deflect, typically between 0.2 to 0.4 mm at its central region 45 from a rest position when the wheel is not in rotation. Since the piezoelectric element 11 acts as a simply supported beam and the nose 44 of the actuator 36 is in contact with the disc 14 at the central position 45 between the area of support for the brass disc 15, the deflection is in the form of a uniform bending of the discs 14 and 15 between the two areas of support 47 of the brass disc 15.

It will be understood that, as the vehicle is in motion, the external area of the tyre adjacent the unit 10 comes in to contact with the surface along which the vehicle is travelling, once with every revolution of the wheel. This contact deforms the area of the tyre adjacent the unit, which deformation is transmitted to the power generator, ultimately in the form of a deformation of the piezoelectric element 11 by the actuator 36. Hence, the piezoceramic disc 14 is subjected to variations in mechanical excitation during rotation of the wheel on the road surface, whereby each excitation results in a potential difference being generated by the piezoceramic disc 14. This process is set out below, with reference to a rotating wheel starting from a position where the area of the tyre adjacent the unit 10 is moving towards contact with a road surface.

With the wheel in rotation, the actuator 36 is in contact with the piezoceramic disc 14, under centrifugal action from the cap 28, PCB 32 and potting compound 34, as described above. The piezoceramic disc 14 therefore experiences a substantially constant deflection under the centrifugal forces which are transmitted through the actuator 36. As the wheel rotates further, the area of the tyre adjacent the unit 10 comes into contact with the road surface and deforms. The deformation results in a deceleration of the tyre in the region of the point of contact with the road surface, causing a sudden reduction in the centrifugal forces experienced by the actuator 36, almost instantaneously, substantially to zero. This change in centrifugal acceleration causes a reduction in the deflection experienced by the piezoceramic disc 14 under action of the actuator 36 and generates a first pulse of electrical charge, which is communicated to the PCB 32.

As the wheel rotates further, at the instant where the area of the tyre adjacent the unit 10 moves away from contact with the road surface, the acceleration of the tyre adjacent the unit 10 increases suddenly, which results in an instantaneous increase in the centrifugal forces experienced by the actuator 36. Hence, piezoceramic disc 14 is again caused to deflect under centrifugal action of the actuator 36, cap 28, PCB 32 and potting compound 34, as described above, which generates a second pulse of electrical charge of opposite polarity to the first pulse described above, which is communicated to the PCB 32.

Hence, during a single revolution of the wheel two pulses of electrical charge, of opposite polarity, are generated in quick succession, constituting a single alternating current output. The rectifier rectifies the alternating current output into a direct current output, which is stored in the capacitors for use to power the tyre monitoring apparatus. For each revolution of the wheel, a small storable electrical charge is generated, typically of 5-10 nano coulombs.

In addition to the storable charge generated with each revolution of the wheel due to contact with the road surface, the unit 10 may also transmit other excitation forces to the piezoelectric element 14, for example accelerations/deflections which are caused by vibrations due to imperfections in the road surface, or out of balance forces on the wheel itself. If the excitation is sufficient to cause deflection of the piezoelectric disc 14, an additional storable charge will be generated and stored in the capacitors, as described above.

In some circumstances, the forces acting on the unit 10 inside a vehicle tyre will not be sufficient to cause uniform bending of the piezoceramic disc 14, as described above. Instead, the deformation will be in the form of a localised 'squashing' of the structure of the disc 14 at the point of contact with, and in the region immediately adjacent to, the actuator. In operation, the localised 'squashing' of the disc structure also generates a potential difference across the element 11, for generating charge substantially as described above.

The unit 10 is particularly advantageous in that the control circuitry is used as an actuating mass for the piezoelectric element 11. In the described embodiment, the weight of the cap 28, the PCB 32 and the potting compound 34 operate as a single unit to act as an actuating mass/exciter for the piezoceramic disc 14, without the need for any additional mass. Hence there is an overall saving in weight in the power generator, to minimise localised wear caused by the unit 10 adjacent the area of mounting in the vehicle tyre, and thus reduce the likelihood of a localised bald spot occurring in the tread of the tyre.

The outer surface C of the base 16 may include an external profile for complimentary engagement with the internal pattern of a vehicle tyre, to limit further the effects of localised wear on the tyre, in use.

In order to utilise the small amounts of power generated by the power generator and to remove the need for a battery backup to power the tyre monitoring apparatus, an ultra low power consumption protocol is used to control the consumption of power stored by the capacitors.

Operation of a tyre monitoring apparatus will now be described by way of example, illustrating the stages which are implemented to ensure that the optimum low power protocol is realised, starting with the monitoring apparatus in a 'sleep' mode, with reference to FIG. 5. As referred to above, the tyre monitoring apparatus includes a unit 10 having a piezoelectric power generator, a micro processor, a radio frequency (RF) transmitter, pressure and temperature sensor circuitry and supervision and control circuitry.

EXAMPLE 1

Stage 1

The micro processor is in 'sleep' mode, in which all internal processing is suspended, apart from a monitor circuit, for monitoring the 'wake up' requirements of the micro processor. In this embodiment, the monitor circuit monitors an externally referenced clock in the form of a crystal oscillator, located outside the micro processor in the power/sensor unit. Hence, in sleep mode, the majority of the micro processor circuitry is disabled and the power consumption of the tyre monitoring apparatus is at minimum level, for example approximately 24 micro ampere of supply current.

Stage 2

After a predetermined time, in this embodiment 60 seconds, the monitor circuit 'wakes up' the micro processor. Upon 'wake up', the micro processor switches from the external clock to an internal clock, in the form of an internal resistor capacitor oscillator. This switch is implemented to facilitate a higher speed operation of the analogue to digital conversions and subsequent calculations which are utilised by the tyre monitoring apparatus. The switch also initiates power to the internal circuitry of the micro processor, which allows the main program of the micro processor to be used and to enable the micro processor to enter a measure and control phase.

Stage 3

Once the micro processor has 'woken up', power is provided to the temperature and pressure sensor circuitry. A prescribed time is then allowed to elapse, in this embodiment 0.5 milliseconds, to facilitate settling of the sensor circuitry, after which time the micro processor measures the local pressure and temperature within the tyre. The values are then stored within the micro processor and the power to the sensor circuitry is removed instantaneously.

Stage 4

The stored pressure and temperature values are concatenated with a sensor identification and cyclic redundancy check to form a data packet for transmitting to a receiver unit/display unit in the vehicle.

Stage 5

The micro processor then switches from the internal clock back to the external clock. This change is employed to ensure accurate time signals for the transmission of the data via the radio frequency (RF) link, since the external clock is a quart crystal time reference unit, which ensures that a higher absolute frequency accuracy is attainable than with the internal clock.

Stage 6

The micro processor sets a control line to a logic high of 3v, which enables the RF transmitter, thus causing it to emit a radio frequency carrier. A settling time of approximately 1 millisecond then elapses to facilitate settling of the RF transmitter components prior to the transmission of data from the PCB 32. A pseudo bit pattern, used to bias a radio frequency data slicer, is then concatenated with the sensor identification and cyclic redundancy check for transmitting. The data to be transmitted is then frequency modulated onto a 433 MHz radio wave for propagation to the receiver unit.

Stage 7

The data is transmitted and power to the RF transmitter is then inhibited instantaneously, at which point the micro processor then re-enters 'sleep mode'.

Hence, by utilising the low power protocol described in stages 1-7 of the above example, the tyre monitoring apparatus utilises only a minimum amount of power from the power generator, to transmit a reading of the local pressure and temperature within the tyre. After use, the micro processor remains in sleep mode for a predetermined period, as referred to in Stage 2 above, while the energy stored in the capacitors is recharged by excitation of the piezoceramic disc 14, as described with reference to FIGS. 1 to 4. Hence, using a continuous cycle of stages 1-7, the tyre monitoring apparatus is able to monitor the local condition of the tyre, utilising the small electrical charges generated by the piezoceramic disc 14, without the need for a back-up battery supply. The continuous cycles are of advantage during normal operating conditions of the tyre, whereby any changes in tyre pressure or temperature, which might indicate a potential problem or failure of the tyre can be monitored, to avoid a blow out, for example. This has particular advantage at high vehicle speeds.

Principally, there is a tri-way interdependency of critical factors in the protocol for the telemetry unit, between the charge generation capability of the piezoelectric element, the charge storage size and efficiency, and the RF transmitter reliability governed by the transmitter 'on' time. For a given type of piezoelectric element, there is an optimum charge capacitance for the power generator and optimum transmission time for the RF transmitter. The piezoelectric element must have sufficient charge generation overcome the impedance of the storage capacitors, and the capacitors must have sufficient capacitance to hold the charge required to perform the measurement/transmission cycle. The RF transmitter 'on' time, i.e. when the transmitter is active and transmitting, must be optimised between a maximum period in which there is sufficient charge to transmit the data prior to the energy storage being exhausted, and a minimum period below which the reliability of the RF link is adversely effected. If transmission time is extended beyond the optimum period, the effective frequency of data transmissions is reduced for a given capacitance.

The data transmitted to the in-car receiver unit is shown to the driver of the vehicle on the display unit for the or each of the sensor circuits in the tyre monitoring apparatus, with respect to each tyre of the vehicle. The display unit informs the driver of the data visually and/or by audible means, for example a link to the audio system in the vehicle.

Each tyre/wheel of the vehicle is marked by an individual identifying feature that relates to a specific sensor located within that tyre. This identifying feature is also represented on the display unit, in combination with the data from the sensor within the tyre. In the event that the wheel is moved to another position on the vehicle it can always be related to the relevant information on the display unit. Suitable identifying features include colour-coded symbols and alpha numeric symbols.

Each sensor has a unique electronic serial number, which can be used to aid the security of the radio transmission data. The unique electronic serial number can also act as an electronic tagging feature for security and anti counterfeiting purposes.

With reference to the preferred embodiment of the power generator, it has been described that a storable electrical charge is generated by the piezoelectric element with each revolution of the vehicle wheel. Therefore, it will be appreciated that the generation of charge is proportional to the speed at which the vehicle is travelling. In the above example of the power consumption protocol, the time delay between transmission of data from the tyre monitoring apparatus and the "wake up" of the micro processor for measuring and transmitting a further reading is set to a predetermined value. In a slow moving vehicle, the electrical charge which is generated and stored within a predetermined time period is less than would be generated and stored in a vehicle travelling at a faster speed in the same time period. Therefore, the time interval between "wake up" of the microprocessor is set at a predetermined value, selected to allow a sufficient electrical charge to be generated and stored for measurement and transmission of the parameters of a tyre on a slow moving vehicle, for example 25 kmh.

However, as the speed of the vehicle increases, the rate of electrical charge generation also increases. Thus, the time period required to generate sufficient electrical charge to enable the tyre monitoring system to measure and transmit the tyre parameters is reduced.

To take advantage of this, the low power protocol described above can be modified so that the micro processor is "awoken" from its sleep mode at intervals relative to a function of the speed of the vehicle or the state of the electrical charge stored in the capacitors, which enables the transmission of data to be varied in proportion to the speed of the vehicle.

The following example shows a preferred mode of operation, in which the rate of transmission of data from the tyre monitoring apparatus is proportional to the speed of the vehicle, starting with the monitoring system in a "sleep" mode, substantially as described in example 1.

EXAMPLE 2

Stage 1

As the wheel rotates, storable power outputs are produced by the power generator, one per revolution, as described above. In this example, this characteristic of the power generator is used to monitor the speed of the vehicle and/or the state of charge of the capacitors. A small portion of each storable power output is signal conditioned to take in to consideration false triggers of power which may be experienced by the piezoelectric disc 14 during rotation of the wheel, for example accelerations/deflections which are caused by vibrations due to imperfections in the road surface. The conditioned signal is then supplied to an interrupt circuit in the micro processor, which momentarily wakes the micro processor from its sleep mode and increments a counter in the micro processor. The micro processor then returns instantly to the sleep mode.

Stage 2

Both the average charge generated per revolution of the wheel and the value of stored charge sufficient to measure and transmit data from the unit 10 are known. Hence, the number of "interrupts" or increments of the counter required for the capacitors to store a charge sufficient for measurement and transmission of data from the apparatus can be calculated.

Therefore, the micro processor can be set to "wake up", substantially as described in stage 2 of example 1, after a predetermined number of revolutions of the wheel, for example 50 revolutions. At this point, power is initiated to the internal circuitry of the micro processor, which allows the main program of the micro processor to be used and to enable the micro processor to enter a measure and control phase.

The internal clock of the micro processor monitors the time taken for the predetermined number of revolutions to be completed. Hence, a value of average speed of the vehicle during the time period can be calculated from the elapsed time and the distance travelled which is cross-referenced from a table of data relating to the diameter of the wheel.

Stage 3

As described in example 1, once the micro processor has 'woken up', power is provided to the temperature and pressure sensor circuitry. A prescribed time is then allowed to elapse, for example 500 micro seconds, to facilitate settling of the sensor circuitry, after which time the micro processor measures the local pressure and temperature within the tyre. The values are then stored within the micro processor and the power to the sensor circuitry is removed instantaneously.

Stage 4

The stored pressure and temperature values are concatenated with a sensor identification and cyclic redundancy check, as described in stage 4 of example 1, and the value of speed calculated during stage 2.

Further stages 5 to 7 are then carried out substantially as described with reference to stages 5 to 7 in the above example.

Since the speed of the data transmissions is proportional to the speed of the vehicle, this mode of operation provides a major safety improvement over known tyre monitoring apparatus, in that the information is transmitted and updated regularly, depending on the speed of the vehicle. This has particular advantage in that a catastrophic failure of a tyre is more likely to occur, possibly with greater consequences, at high vehicle speed. The unit 10 is more regularly updated at high vehicle speeds than at lower speed, thereby improving vehicle safety by warning the driver of any deflation of the vehicle tyres, for example.

A power/sensor unit according to a further embodiment of the invention is indicated at 100 in FIG. 6 to 11, which corresponds substantially to the unit 10 described above.

Figure 6:
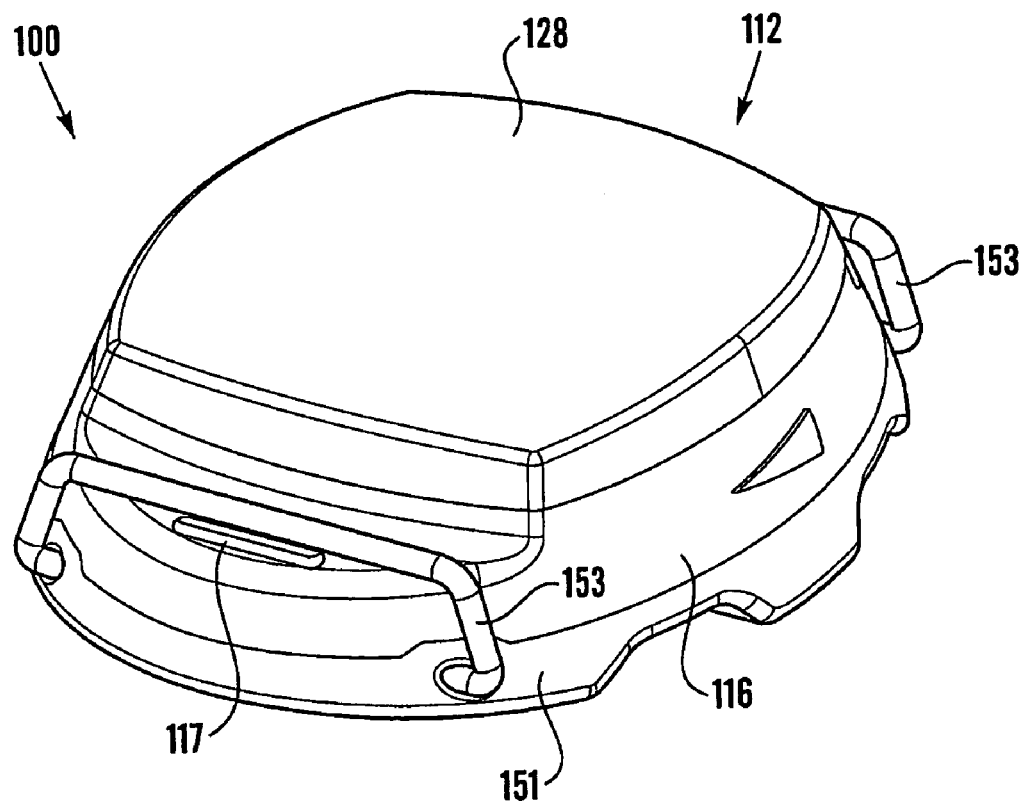
FIG. 6 is a perspective view of a further embodiment of a telemetry unit in accordance with a further preferred embodiment of the invention.

As shown in FIG. 6, the unit 100 includes a housing 112, which consists of a base portion 116 and a cap 128 mounted on the base portion 116. The housing 112 is removably mounted on a resilient base or footing 151 made of a rubber or any other suitable material. A pair of resilient clip arms 153 are pivotably provided on the footing 151, for snap-fitting engagement with formations 117 on the base portion 116 of the housing 112. The unit 100 can be simply removed from the footing 151 by unclipping the arms 153 from their engagement with the formations 117, for repair or installation in another tyre using a new footing 151, for example.

Figure 10:
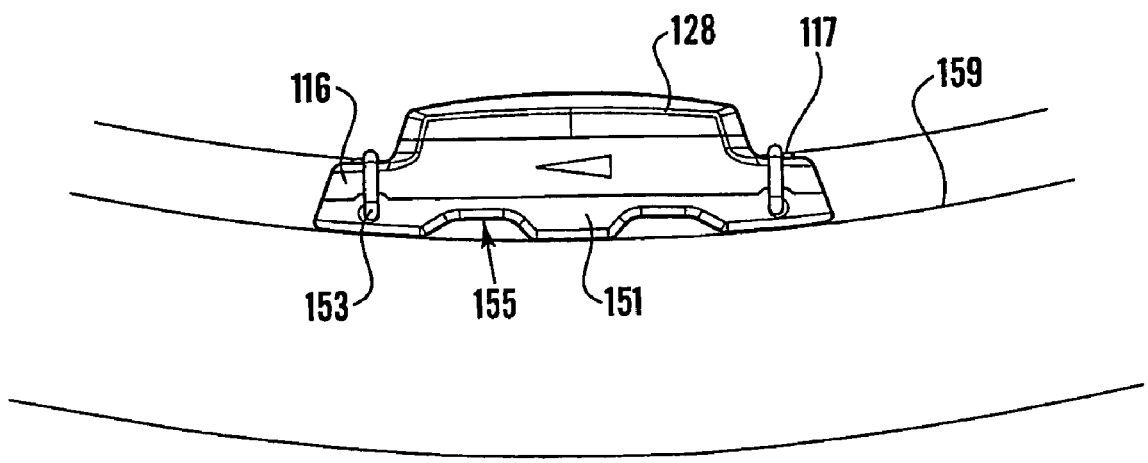
FIG. 10 shows an end view of the unit of FIGS. 6 to 9 in use in a pneumatic tyre.
Figure 11:
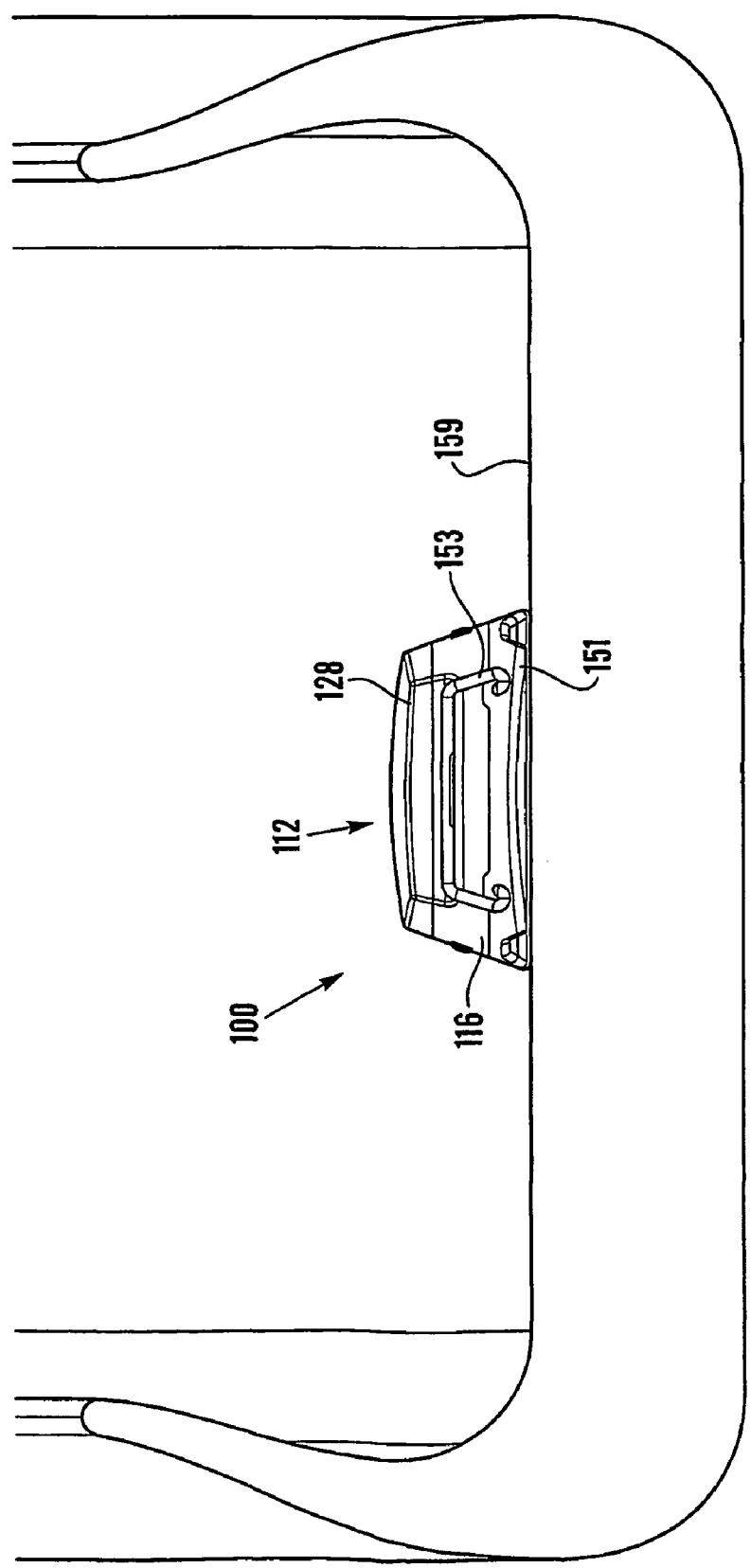
FIG. 11 is a side view of the unit as shown in FIG. 10.

The footing 151 is adapted to be permanently secured to an internal surface 159 of a tyre, as shown in FIGS. 10 and 11, and can be disposed of with the tyre after use. Two air channels 155 are provided in the footing 151, which have the dual function of allowing air movement about the unit 100, in use, and providing a footing of sufficient flexibility to aid protection and shock absorption for the internal components of the unit 100, whilst propagating the flexure of the tyre during rotation to the internal components of the unit 100.

The footing 151 is generally elliptical and has a greater surface area than the base portion 116 of the housing 112. The shape and size of the footing 151 is designed to spread the load of the unit 100 on a tyre, to reduce adverse tyre wear in the region of the unit 100, that may otherwise be expected when providing a localised mass on the inside of a tyre, the mass of the unit 100 being in the region of between 30-50 grams.

Figure 7:
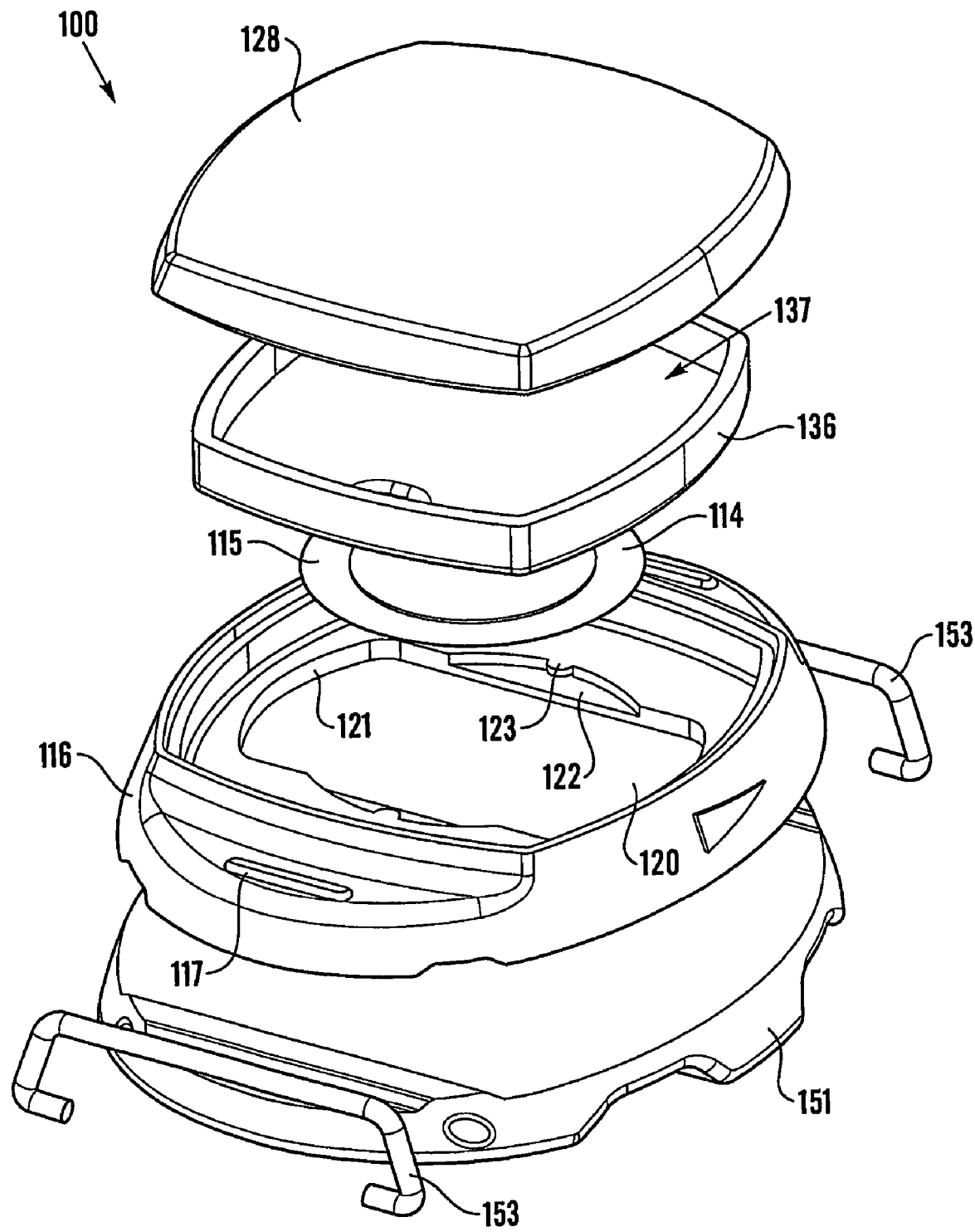
FIG. 7 is perspective exploded view of the unit of FIG. 6, from above.
Figure 8:
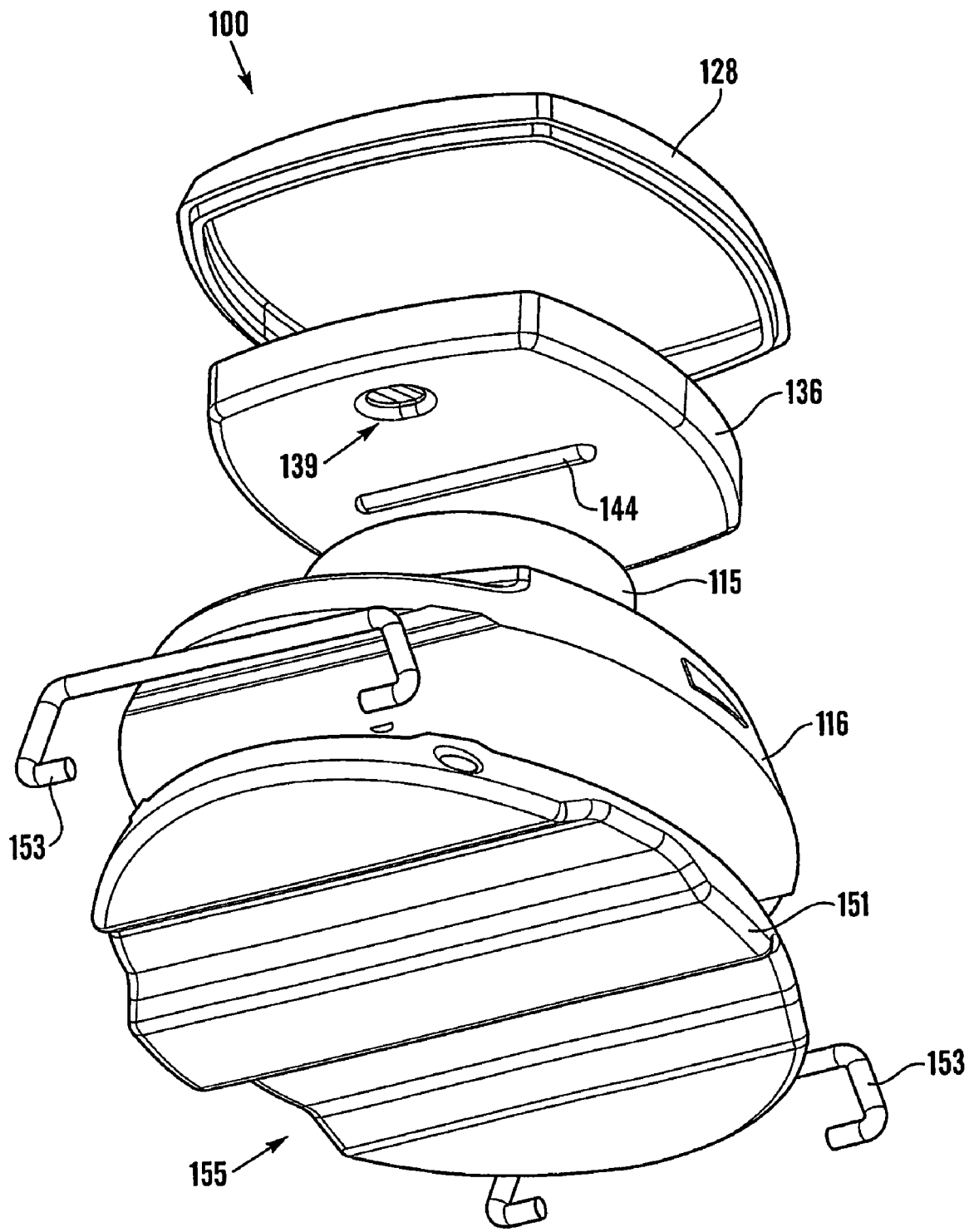
FIG. 8 is a perspective exploded view of the unit of FIGS. 6 and 7, from below.
Figure 9:
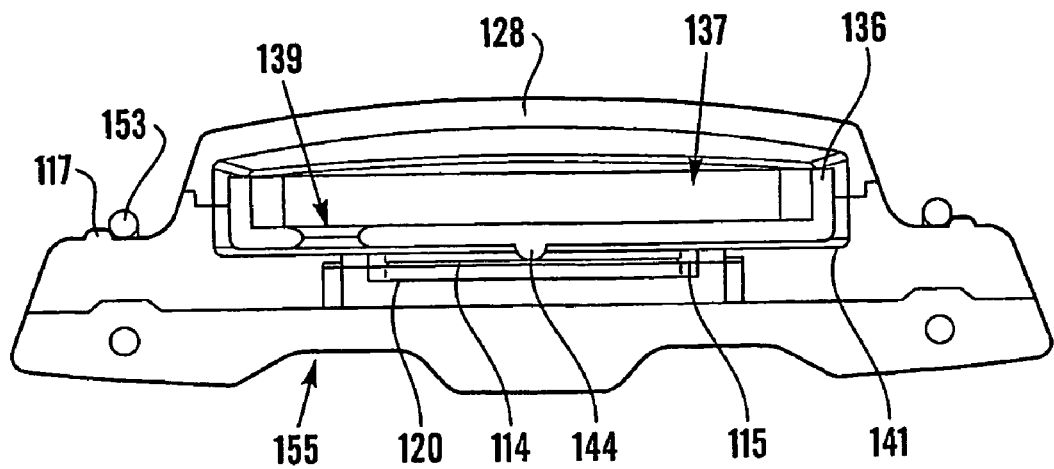
FIG. 9 is a cross-sectional view through the unit of FIGS. 6 to 8.

Referring specifically to FIGS. 7 to 9, the internal configuration of the housing 112 and the internal components of the unit 100 will now be described.

The unit 100 includes a piezoelectric element 114 mounted on a brass supporting disc 115, substantially as described with reference to FIGS. 1 to 4. The base portion 116 of the housing 112 defines a compartment 118 formed by a base wall 120 and a peripheral wall 121. Recesses 122 are formed in the peripheral wall 121, for supporting a part of the periphery of the brass disc 115. When supported on the base portion 116, the central portion of the brass disc 115 is spaced apart from the base wall 120. In this embodiment, tabs 123 are provided which extend over a portion of the recesses 122, for engagement with the periphery of the brass disc 115, for retaining the brass disc 115, and thereby the piezoelectric element 114, on the base portion 116.

The unit 100 includes a one-piece moulded actuator 136 defining a chamber 137, which is movably mounted in the housing 112. A printed circuit board or PCB (not shown), corresponding to the PCB 32 described with reference to the embodiment of FIGS. 1 to 4 is mounted in the chamber 137. The PCB is in electrical communication with the piezoceramic disc 114 via wires (not shown), which pass through an aperture 139 in the floor of the chamber 137. The PCB is securely located on the actuator 136 by a potting compound (not shown), which protects the PCB during installation or transit of the unit 100, as well as from the harsh environment within a rotating pneumatic tyre in use.

An elongate projection or nose 144 is formed on the underside of the actuator 136, as can be seen in FIG. 8. In a normal rest position in the housing 112, the nose 144 is in contact with the piezoceramic disc 114, as can be seen in FIG. 9. In the rest position, the underside of the actuator 136 is spaced from an internal surface 141 of the base portion 116 by a distance of approximately 0.3 mm.

In use, the piezoelectric element 114 is deflected in the direction of the base wall 120 under action of the actuating mass, and it will be appreciated, therefore, that the maximum deflection is limited to approximately 0.3 mm, as the periphery of the actuator 136 comes into contact with the internal surface 141. This maximum deflection is limited to protect the piezoelectric element 114 from excessive bending, and may be any suitable distance, for example between 0.2 and 0.5 mm. It will be appreciated that the components of the PCB and potting compound form part of an actuating mass for excitation of the piezoelectric element, with the actuator 136.

The housing 112 is injection moulded from plastics and is adapted to withstand the harsh environment within a pneumatic vehicle tyre. The piezoceramic disc 114, and actuator 136 and control circuitry form are thus part of a power generator for use in a preferred embodiment of the invention.

The unit 100 operates substantially in the same way as the unit 10, as described above therefore operation of the unit 100 is not described in significant detail.

In summary, it will be appreciated that the units 10, 100 each serve as a telemetry unit, which is capable of measuring and transmitting data relevant to tyre conditions local to the unit.

The concept of mounting an in-tyre telemetry unit to the inner surface of a tyre by means of a sacrificial footing 151 which can be permanently bonded to the tyre is not limited to the application with units having a piezoelectric power generator as described above. The footing can be used with any suitable telemetry unit. Accordingly, the applicant may claim independent patent protection to this concept.

The invention claimed is:

1. A telemetry unit for a tire monitoring apparatus, the telemetry unit including a housing having sensor means for measuring data relevant to the local environment of the telemetry unit, transmission means for transmitting measured data to a remote location, a piezoelectric power generator adapted to generate and store an electrical charge in response to rotation of the tire for powering the unit, and control means for controlling the sensor means and transmission means, in which the control means is arranged to vary the rate of transmission of data from the telemetry unit in dependence on the rotary speed of the tire, and wherein the piezoelectric power generator is arranged to produce at least one pulse of electric charge for each rotation of the tire, and the control means is adapted to monitor the number and/or frequency of the pulses generated in order to determine the appropriate rate of transmission of data.

2. A telemetry unit as claimed in claim 1, wherein the control means is adapted to initiate monitoring of the local environment and transmission of measured data after a predetermined number of pulses has been detected.

3. A telemetry unit as claimed in claim 1, in which the housing is adapted to be mounted to an inner wall of a tire.

4. A telemetry unit as claimed in claim 1, in which an exterior surface of the housing has a substantially arcuate profile adapted for bonding to an arcuate interior surface of a vehicle tire.

5. A telemetry unit as claimed in claim 1, in which an exterior surface of the housing includes an external profile for complimentary engagement with the internal pattern of a vehicle tire.

6. A telemetry unit as claimed in claim 1, in which the housing is releasably mounted on a footing adapted to be bonded to the internal wall of a tire.

7. A telemetry unit as claimed in claim 6, in which the housing is releasably mounted on the footing by means of clips.

8. A telemetry unit as claimed in claim 6, in which the footing includes air channels for allowing movement of air about the housing, in use.

9. A telemetry unit as claimed in claim 1, in which the sensor means includes at least one of a pressure sensor and/or a temperature sensor.

10. A telemetry unit as claimed in claim 1, in which an actuator is movable mounted in the housing and adapted for contact with the piezoelectric element under centrifugal forces.

* * * * *